United States Patent [19]

Kimura et al.

[11] Patent Number: 5,479,827

[45] Date of Patent: Jan. 2, 1996

[54] CAPACITIVE PRESSURE SENSOR ISOLATING ELECTRODES FROM EXTERNAL ENVIRONMENT

[75] Inventors: Shigeo Kimura; Yoshiyuki Ishikura; Takashi Kihara; Takashi Masuda, all of Kanagawa, Japan

[73] Assignee: Yamatake-Honeywell Co., Ltd., Tokyo, Japan

[21] Appl. No.: 319,532

[22] Filed: Oct. 7, 1994

[51] Int. Cl.$^6$ ................................................ G01L 13/06
[52] U.S. Cl. ........................... 73/718; 73/724; 361/283.4
[58] Field of Search ................... 73/718, 724; 361/283.4

[56] References Cited

U.S. PATENT DOCUMENTS

| | | |
|---|---|---|
| 3,397,278 | 8/1968 | Pomerantz . |
| 4,257,274 | 3/1981 | Shimada et al. . |
| 4,523,474 | 6/1985 | Browne et al. ................ 361/283.4 X |
| 4,542,435 | 9/1985 | Freud et al. . |
| 4,589,054 | 5/1986 | Kuisma . |
| 4,597,027 | 6/1986 | Lehto . |
| 4,599,906 | 7/1986 | Freud et al. . |
| 4,609,966 | 9/1986 | Kuisma . |
| 4,628,403 | 12/1986 | Kuisma . |
| 4,879,627 | 11/1989 | Grantham ........................ 73/718 X |
| 5,006,952 | 4/1991 | Thomas ........................... 73/718 X |

FOREIGN PATENT DOCUMENTS

63-308529  12/1988  Japan .

*Primary Examiner*—Richard Chilcot
*Assistant Examiner*—Joseph L. Felber
*Attorney, Agent, or Firm*—Lane, Aitken & McCann

[57] ABSTRACT

A capacitive pressure sensor is provided which is capable of highly accurately and reliably measuring pressure over a wide range from an extremely low level to a high level without being affected by environmental changes. The capacitive pressure sensor is constructed of a first diaphragm; a second diaphragm arranged in parallel with the first diagram; a diaphragm support arranged between the first and second diaphragms for supporting the first and second diaphragms along the periphery thereof to define a space isolated from the outside; a plurality of pillars having respective ends fixed on the opposing surfaces of the first and second diaphragms for securely supporting the first and second diaphragms; a movable electrode formed on one of the opposing surfaces of the first and second diaphragms; and a fixed electrode formed in the space without contacting with the plurality of pillars and securely supported by the diaphragm support. Pressure values measured by the capacitive pressure sensor are substantially free from errors due to fluctuations in atmospheric pressure and errors caused by aging changes of residual stress on the bonding interface.

7 Claims, 10 Drawing Sheets

CAPACITIVE PRESSURE SENSOR ISOLATING ELECTRODES FROM EXTERNAL ENVIRONMENT

BACKGROUND OF THE INVENTION

The present invention relates to an improved capacitive pressure sensor having a diaphragm structure for capacitively sensing changes in pressure under measurement.

Figure 1:
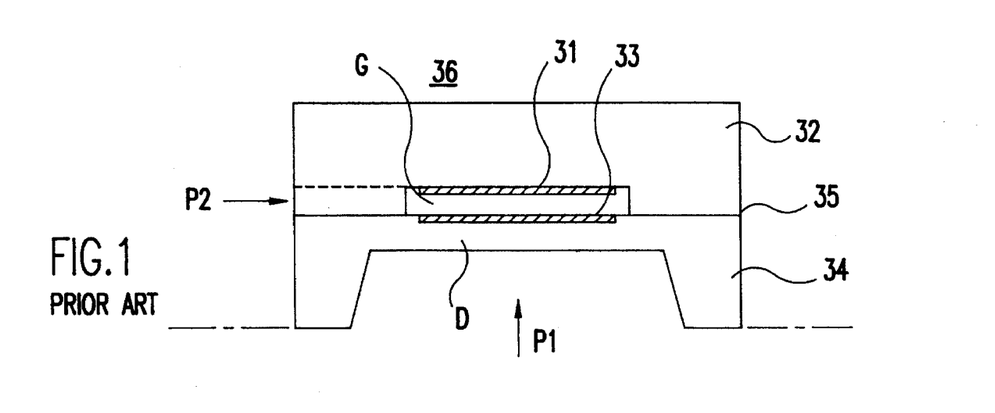
FIG. 1 is a cross-sectional view showing the structure of a prior art capacitive pressure sensor.

Conventionally, a capacitive pressure sensor of a type shown in a cross-sectional view of FIG. 1 has been proposed. Specifically, a pressure sensor 36 includes a cover glass 32 typically made of heat resistant glass, such as that sold under the trademark Pyrex glass or the like having a cavity in which a fixed electrode 31 is deposited on the bottom thereof, and a silicon substrate 34 on which a movable electrode 33 is deposited at a position opposite to the fixed electrode 31. The cover glass 32 and the silicon substrate 34 are bonded with each other by anode-bonding their peripheral portions or bonding surfaces 35 such that the electrodes face in parallel with each other, thus forming a diaphragm sensing portion D. This pressure sensor is used with the silicon substrate 34 or the movable electrode 33 being placed to receive pressure under measurement (P1) and with the fixed electrode 31 being placed to receive the atmospheric pressure (P2).

In operation, an increase in pressure under measurement P1 causes the diaphragm sensing portion D of the capacitive pressure sensor 36 to be deformed, which results in changing the gap G between the fixed electrode 31 and the movable electrode 33 (the gap is narrowed in this case). Then, a varying capacitance value of a capacitor formed of the fixed electrode 31 and the movable electrode 33, caused by the changed gap G, is sensed to detect the pressure under measurement P1.

The conventional capacitive pressure sensor thus constructed, however, has a problem that changes in environmental factors such as humidity and so on cause corresponding fluctuations in the dielectric constant of air existing in the gap G between the fixed electrode 31 and the movable electrode 33. This leads to the capacitance value of the capacitor formed of the fixed electrode 31 and the movable electrode 33 varying due to factors other than changes in pressure under measurement.

Laid-open Japanese Patent Application No. 63-308529 (1988) proposes, as a solution to the problem mentioned above, a capacitive pressure sensor having a reference capacitor for removing error factors due to environmental changes such as changes in humidity.

This capacitive pressure sensor has a sensing capacitor, the capacitance value of which changes in response to pressure under measurement, and a reference capacitor, the capacitance value of which does not change even if pressure under measurement varies. Since the same atmospheric pressure is introduced into gaps between electrodes of the respective capacitors, error factors possibly caused by environmental changes can be removed by subtracting the capacitance value of the reference capacitor from the capacitance value of the sensing capacitor.

Although the capacitive pressure sensor constructed as proposed in Laid-open Japanese Patent Application No. 63-308529 is effective in providing accurate measurements to some degree, it cannot deal with errors caused by dew condensation on the surface of electrodes constituting the capacitors and small dust particles introduced into the gap between the electrodes. The dew condensation is regarded as an inevitable phenomenon when a temperature of a gas or liquid to be measured is lower than the atmospheric temperature. Also, the introduction of dust particles is an inevitable problem as long as the pressure sensor has a atmospheric pressure introducing hole.

In addition to the above-mentioned environmental changes, the foregoing type of pressure sensors possibly suffer from errors due to aging change of residual stress on the bonding interface between different materials used for the sensor structure, e.g., the cover glass and the silicon substrate in the prior art example.

These problems give rise to erroneous measurements of pressure, so that accurate and reliable pressure measurement is rendered impossible.

OBJECTS AND SUMMARY OF THE INVENTION

The present invention has been made to solve the above-mentioned problems, and it is an object of the invention to provide a capacitive pressure sensor which is capable of capacitively measuring pressure in a wide range from a extremely low level to a high level, and is substantially free from errors due to environmental changes, dew condensation on electrodes, and dust particles introduced into the gap between electrodes, as well as errors in measured pressure values due to aging change of residual stress on the bonding interface which would occur when different materials are used for a sensor structure.

To achieve the above object, the present invention provides a capacitive pressure sensor comprising: a first diaphragm; a second diaphragm having a cavity in one surface thereof and bonded to the first diaphragm so as to isolate the cavity from the outside; a plurality of pillars for securely supporting the first and second diaphragms; a movable electrode formed on the bottom of the cavity in the second diaphragm; and a fixed electrode formed over the entire area of the cavity without contacting with the plurality of pillars, the fixed electrode securely supported by the inner wall of the cavity substantially in parallel with the movable electrode, the fixed electrode constituting a capacitor structure together with the movable electrode.

Preferably, the first and second diaphragms are made of sapphire and are bonded by a direct bonding technique.

The fixed electrode may be sandwiched by first and second insulating layers.

Further, the capacitive pressure sensor may further comprise an excessive pressure protecting mechanism for protecting the capacitive pressure sensor from being destroyed by an excessively large pressure applied thereto. The excessive pressure protecting mechanism may include a first stopper having a pressure introducing groove and a recess on one surface, arranged on the first diaphragm, with the surface formed with the recess facing the top surface of the first diaphragm; and a second stopper having a pressure introducing groove and a recess on one surface, arranged below the second diaphragm, with the surface formed with the recess facing the bottom surface of the second diaphragm.

According to the structure of the capacitive pressure sensor according to the present invention having a plurality of pillars, even if the atmospheric pressure rises to generate a force large enough to destroy the first and second diaphragms, the pillars prevent such force from doing so.

Also, since main constituents of the capacitive pressure sensor are made of the same material, i.e., sapphire i, and also since the diaphragms are bonded without using any adhesive of a different material, no stress remains between the bonded diaphragms when manufacturing the sensor, thus preventing errors in measurement caused by aging change of residual stress on the bonding interface which would occur when different materials are bonded.

In addition, the above described structure allows a multiplicity of sensor chips to be manufactured in a single substrate in a similar manner to the semiconductor manufacturing process, so that a mass production of consistent sensor chips can be realized. Therefore, a large number of highly reliable pressure sensors can be manufactured at a low cost.

The above and other objects, features and advantages of the present invention will become apparent from the following detailed description of the preferred embodiments when read in connection with the accompanying drawings.

DETAILED DESCRIPTION OF THE PREFERRED EMBODIMENTS

The present invention will hereinafter be described in detail in connection with the preferred embodiments thereof with reference to the accompanying drawings.

Figure 2A:
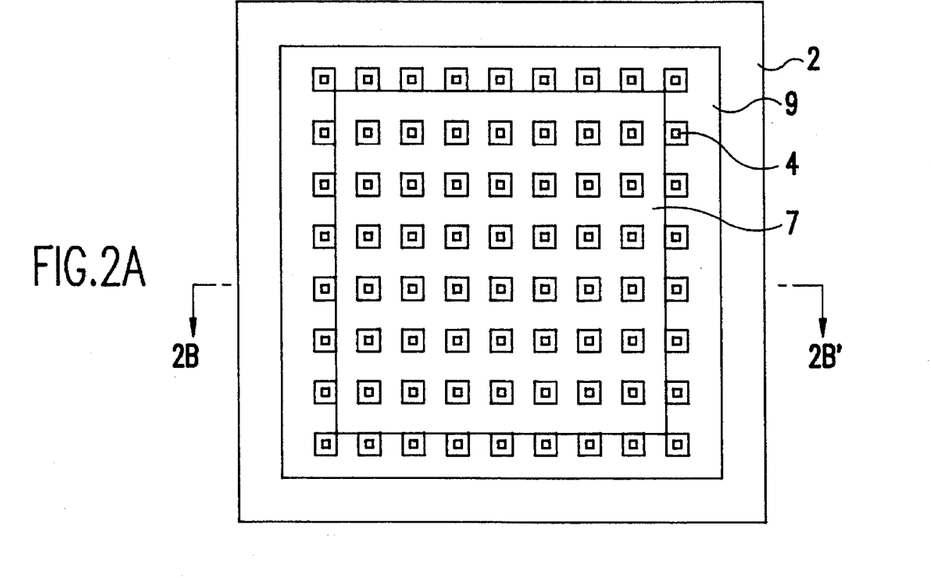
FIG. 2A shows a plan view of a capacitive pressure sensor according to a first embodiment of the present invention.
Figure 2B:
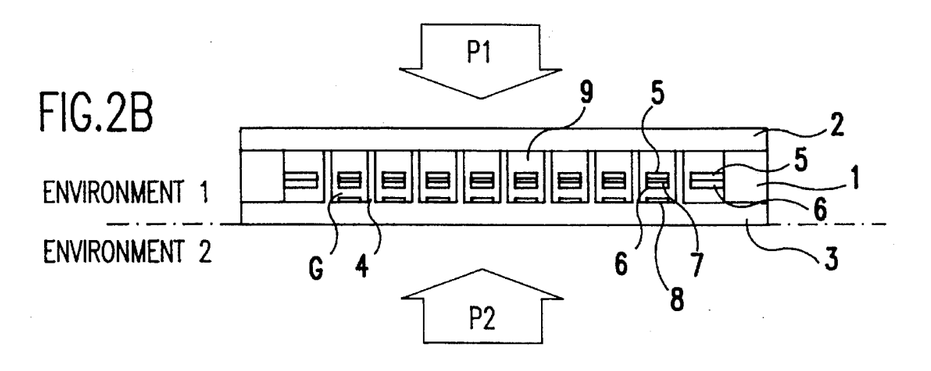
FIG. 2B is a cross-sectional view showing the structure of the capacitive pressure sensor illustrated in FIG. 2A.

Referring first to FIGS. 2A–2B showing a first embodiment of the present invention, a capacitive pressure sensor includes a diaphragm support 1 substantially formed in a frame structure; first and second thin diaphragms formed to seal one and the other opening ends of the diaphragm support 1; and a plurality of pillars 4 for securely coupling the opposing surfaces of the first and second diaphragms 2, 3 at a plurality of positions thereon. The plurality of pillars 4 and the diaphragm support 1 are formed integrally with the second diaphragm 3 and securely coupled to the first diaphragm 2 by anode bonding without using any bonding agent. Preferably, the diaphragm support 1 and the first and second diaphragms 2, 3 are made, for example, of sapphire substrate. The plurality of pillars 4 and the diaphragm support 1 are bonded with and securely coupled to the first diaphragm 2 by directly bonding the sapphire substrates at a temperature lower than the melting point of sapphire. The sensor of FIG. 2 further includes first and second fixed electrode support plates 5, 6 having their peripheries securely attached to the inner wall of the diaphragm support 1 and respectively facing the first and second diaphragms 2, 3; a fixed electrode 7 made of an electrically conductive thin film sandwiched between the first and second fixed electrode support plates 5, 6; and a movable electrode 8 formed on the top of the second diaphragm 3 in opposition to the fixed electrode 7. The fixed electrode 7 is securely attached to the diaphragm support 1 by the help of peripheral portions of the first and second fixed electrode support plates 5, 6 which extend to and attached on the inner wall of the diaphragm support 1.

Preferably, the first and second fixed electrode support plates 5, 6 are also made of sapphire, i.e., the same material as that of the first and second diaphragms 2, 3. The gap G between the second fixed electrode support plate 6 and the movable electrode 8 is in the order of micrometer, and the gap between the movable electrode 8 and the fixed electrode 7 is approximately one micrometer. Thus, the movable electrode 8 and the fixed electrode 7 face with each other, spaced by approximately one micrometer, to constitute a capacitor structure, i.e., a capacitive sensor element. The diaphragm support 1, the first diaphragm 2, and the second diaphragm 3, having the capacitor structure, define a cavity 9 which is completely sealed and isolated from the external environment. The inside of the cavity 9 is vacuumed or filled with a gas.

Figure 2C:
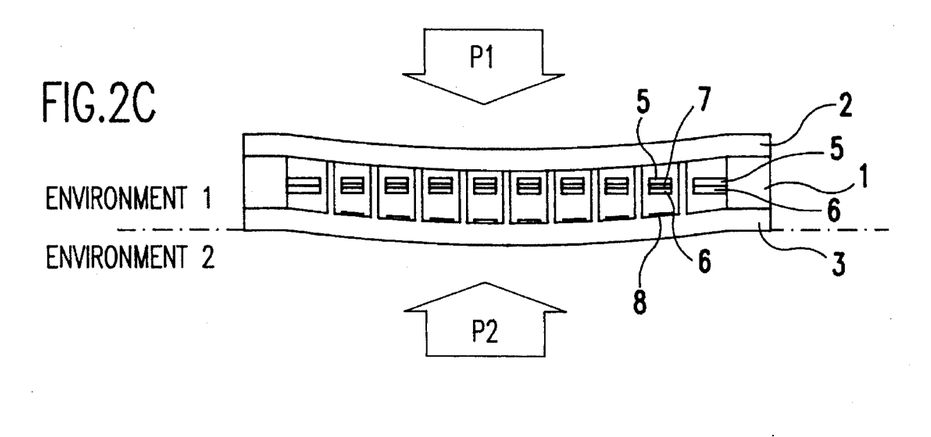
FIG. 2C is a cross-sectional view of the capacitive pressure sensor of FIG. 2B in operation.

As shown in FIG. 2C, the capacitive pressure sensor thus constructed is placed such that the first diaphragm 2 is applied with pressure under measurement P1 in Environment 1 (e.g., atmospheric pressure) and the second diaphragm 3 is applied with pressure under measurement P2 in Environment 2. Assuming that P1 is larger than P2, when the first diaphragm 2 is applied with P1 and a pressure difference between P1 and P2 is generated, the first diaphragm 2 and the second diaphragm 3 are integrally deformed by this pressure difference, resulting in displacement of the gap between the first and second diaphragms 2, 3. This displacement also causes the movable electrode 8 formed on the second diaphragm 3 to integrally displace. This results in changing the distance between the movable electrode 8 and the fixed electrode 7 to vary the capacitance value of the capacitor structure formed of the movable electrode 8 and the fixed electrode 7. The pressure under measurement can be derived by detecting this varying capacitance value.

Since the cavity 9 is isolated and vacuumed or filled with a gas, changes in environmental conditions such as humidity change will not cause the dielectric constant between the movable electrode 8 and the fixed electrode 7 to vary. Also, it is apparent that dust particles and so on, even included in a used environment, will not affect the measurement of pressure. Further, the use of the capacitive pressure sensor in a dew condensing environment will not affect the measurement of pressure. It is appreciated that the capacitive pressure sensor of the present invention is thus substantially free from errors due to environmental changes such as changes in humidity and so on.

In general, when the cavity 9 is sealed, measured capacitance values may vary due to fluctuations in the atmospheric pressure. Particularly for measurements in a low pressure range below approximately 1 Kg/cm$^{-2}$, such fluctuations in the atmospheric pressure possibly result in large measurement errors. The structure of the capacitive pressure sensor according to the present invention, however, has the plurality of pillars 4, so that even if the atmospheric pressure rises to generate a force large enough to crush the first and second diaphragms 2, 3, the pillars 4 prevent such force from doing so. Consequently, the first and second diaphragms 2, 3 will not be deformed by such a force caused by fluctuations in the atmospheric pressure. Thus, pressure values measured by the capacitive pressure sensor of the present invention are substantially free from errors due to fluctuations in the atmospheric pressure.

Also, since main constituents of the capacitive pressure sensor are made of the same material, i.e., sapphire in this embodiment, and also since the diaphragms 2, 3 are bonded without using a bonding agent of a different material, no stress remains between the bonded diaphragms 2 and 3 when manufacturing the sensor, thus preventing errors in measurement caused by aging change of residual stress on the bonding interface which would occur when different materials are bonded.

In addition, the above described structure allows a multiplicity of sensor chips to be manufactured in a single substrate in a similar manner to the semiconductor manufacturing process, so that a mass production of consistent sensor chips can be realized. Therefore, a large number of highly reliable pressure sensors can be manufactured at a low cost.

Figure 3A:
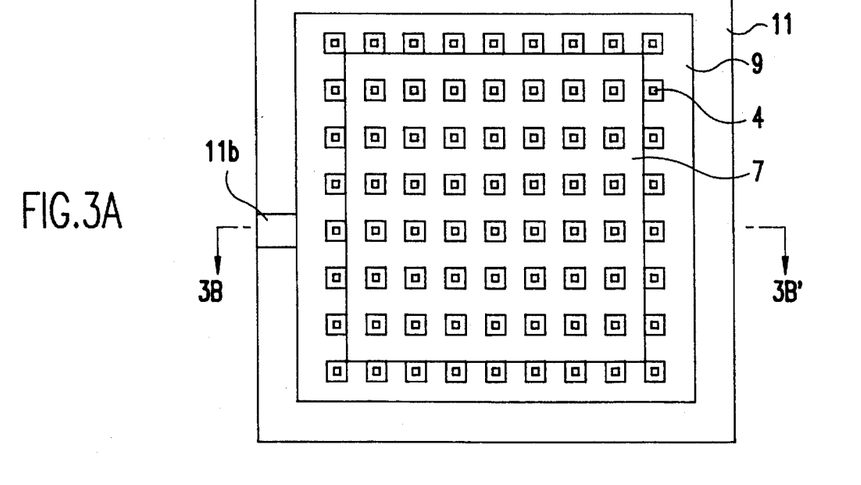
FIG. 3A shows a plan view of a capacitive pressure sensor according to a second embodiment of the present invention.
Figure 3B:
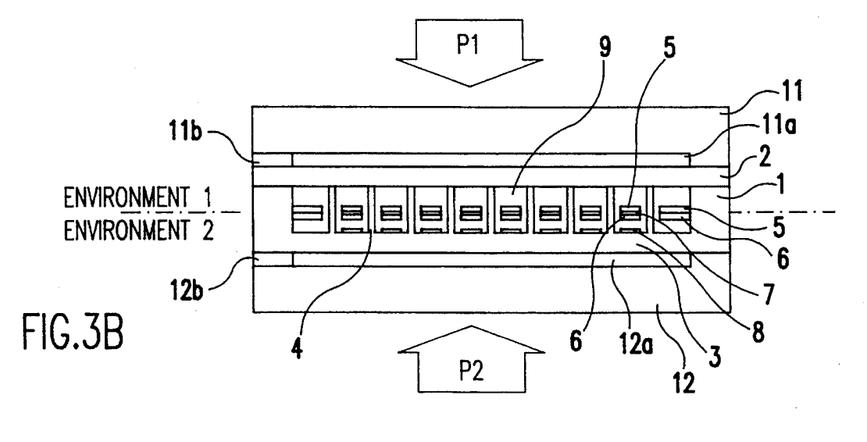
FIG. 3B is a cross-sectional view showing the structure of the capacitive pressure sensor illustrated in FIG. 3A.

FIG. 3A and 3B show a capacitive pressure sensor according to a second embodiment of the present invention in a plan view and cross-sectional view, respectively. Parts corresponding to those in FIGS. 2A and 2B are designated the same reference numerals. Briefly, the second embodiment differs from the first embodiment in that the former is provided with a first stopper 11 bonded on the outer surface of the first diaphragm 2 and a second stopper 12 bonded on the outer surface of the second diaphragm 3 as mechanisms for protecting the respective diaphragms from being destroyed by excessively large pressure. The first stopper 11 is formed with a recess 11a in the surface facing the outer surface of the first diaphragm 2 and with a pressure introducing hole 11b through which the recess 11a communicates with Environment 1. Similar to the first stopper 11, the second stopper 12 is formed with a recess 12a in the surface facing the outer surface of the second diaphragm 3 and with a pressure introducing hole 12b through which the recess 12a communicates with Environment 2.

With this structure, when pressure P1 (e.g., atmospheric pressure) in Environment 1 is introduced into the recess 11a through the pressure introducing hole 11b formed through the first stopper 11 and applied to the first diaphragm 2, while pressure under measurement P2 in Environment 2 is introduced into the recess 12a through the pressure introducing hole 12b and applied to the second diaphragm 3, to generate a pressure difference between P1 and P2, similarly to the aforementioned first embodiment, the first and second diaphragms 2, 3 are integrally deformed by an amount in accordance with the pressure difference. This causes the distance between the movable electrode 8 and the fixed electrode 7 to change, with the result that the capacitance value of the capacitor structure formed of the movable electrode 8 and the fixed electrode 7 is changed. Thus, by measuring this capacitance value, the pressure under measurement is detected.

In the second embodiment, since the first and second stoppers 11, 12 are provided on the respective outer surfaces of the first and second diaphragms 2, 3 to mechanically protect the same from excessively large pressure possibly applied from both Environment 1 and Environment 2, the reliability of the sensor is improved. Particularly in an extremely low pressure range on the order of 100 mmH$_2$O, an excessive pressure protecting mechanism is essential to a capacitive pressure sensor. It is therefore understood that the capacitive pressure sensor of the second embodiment having such a protection mechanism is suitable for measurements in an extremely low pressure range.

Figures 4A, 4B:
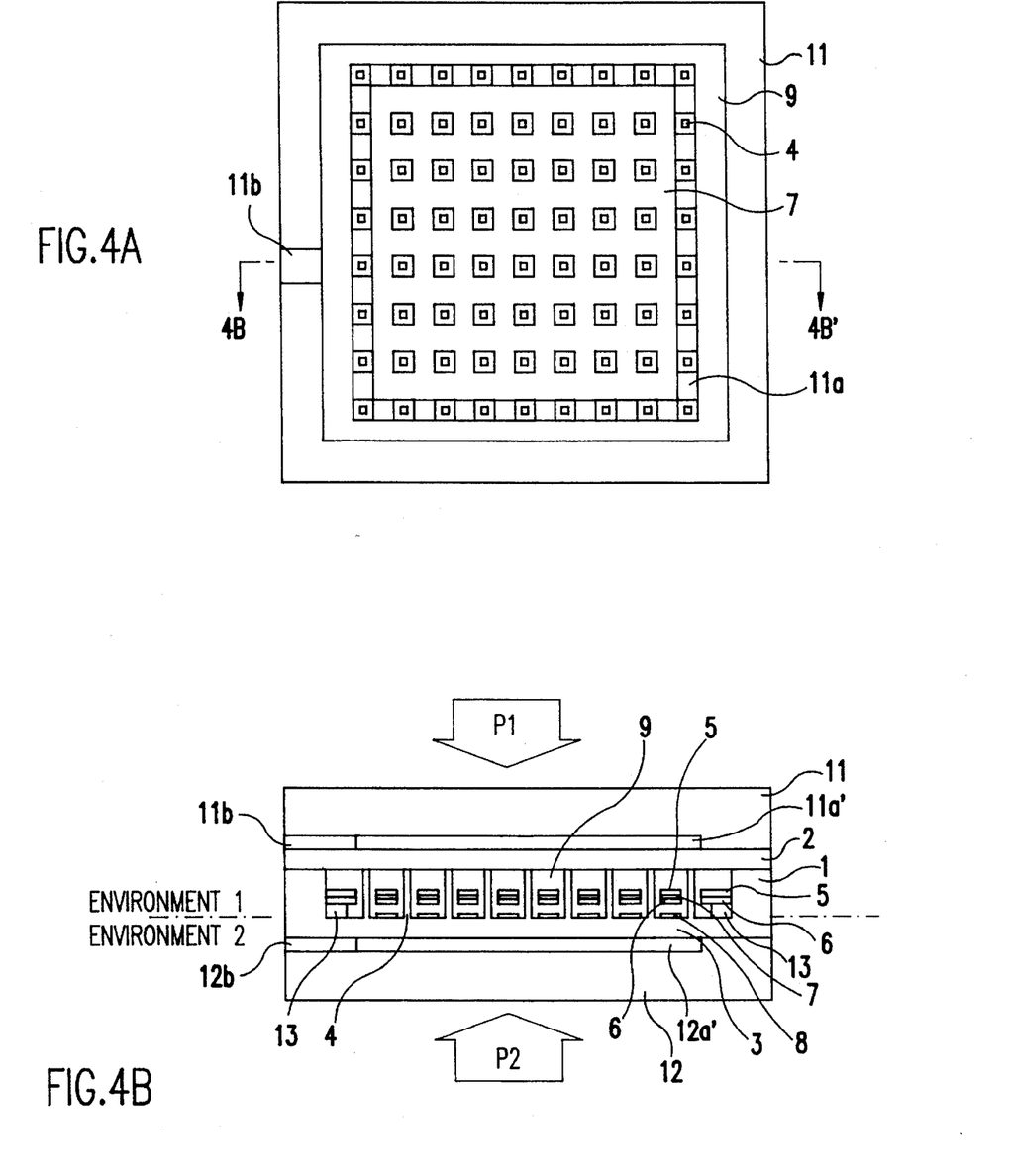
FIG. 4A shows a plan view of a capacitive pressure sensor according to a third embodiment of the present invention.
FIG. 4B is a cross-sectional view showing the structure of the capacitive pressure sensor illustrated in FIG. 4A.

FIGS. 4A and 4B show a third embodiment of the capacitive pressure sensor according to the present invention. In these drawings, parts identical to those in FIGS. 2A–2C are designated the same reference numerals. The third embodiment differs from the second embodiment in the way a fixed electrode 7 sandwiched by a first electrode support plate 5 and a second electrode support plate 6 is fixed to a diaphragm support 1 as well as the area of a recess 11a' in a first stopper 11 and the area of a recess 12a' in a second stopper 12.

More specifically, the fixed electrode 7 sandwiched by the first and second electrode support plates 5 and 6 is carried on a remaining sacrifice layer 13 formed on a peripheral portion of the bottom of the second diaphragm 3, as illustrated. Also, the areas of the respective first recess 11a' and second recess 12a' are formed smaller than that of a central cavity 9 so as to be accommodated inside the remaining sacrifice layer 13, when viewed in the cross-sectional view of FIG. 4B. In this way, movable ranges of the first and second diaphragms 2, 3 are limited within the depths of the first recess 11a' and the second recess 12a', respectively.

With the structure described above, the fixed electrode sandwiched by the support plates 5, 6 is securely supported on the remaining sacrifice layer 13 formed on the peripheral portion of the bottom of the second diaphragm 3 to extend a contact area of the fixed electrode to the diaphragm support 2, thus providing a larger mechanical strength or a reinforcement to the fixed electrode supporting structure.

Figure 5A:
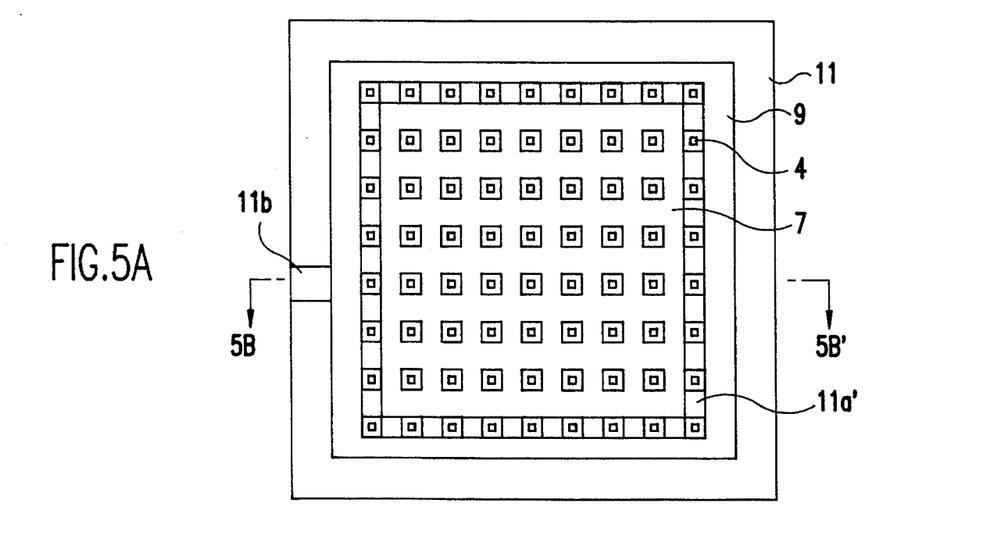
FIG. 5A shows a plan view of a capacitive pressure sensor according to a fourth embodiment of the present invention.
Figure 5B:
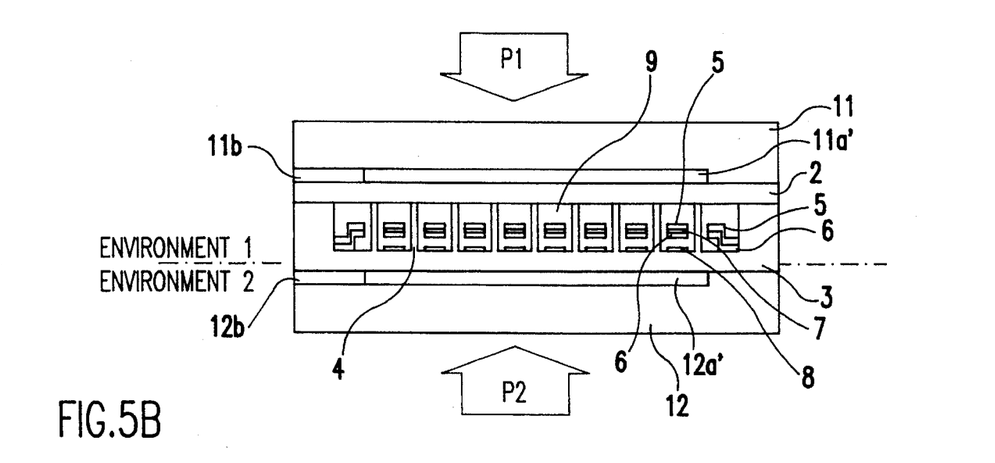
FIG. 5B is a cross-sectional view showing the structure of the capacitive pressure sensor illustrated in FIG. 5A.

FIGS. 5A and 5B show a fourth embodiment of the capacitive pressure sensor according to the present invention. In these drawings, parts identical to those in FIGS. 2A–2C are designated the same reference numerals. The fourth embodiment differs from the second embodiment in the way a fixed electrode 7 sandwiched by a first electrode support plate 5 and a second electrode support plate 6 is fixed to a diaphragm support 1 as well as the area of a recess 11a' in a first stopper 11 and the area of a recess 12a' in a second stopper 12.

More specifically, the fixed electrode 7 sandwiched by the support plates 5, 6 has its edge portion in contact with a peripheral portion of the bottom of the second diaphragm 3, as illustrated, such that the fixed electrode 7 is securely supported by the first and second electrode support plates 5, 6 as well as the diaphragm support 1. Also, the first recess 11a' and the second recess 12a' are formed smaller than the entire surface area of a central cavity 9. When seen in the cross-sectional view of FIG. 5B, the first and second recesses 11a' and 12a' are formed in such a size that they are accommodated inside the contacted portion of the fixed electrode 7 on the bottom of the central cavity 9 in the second diaphragm 3. In this way, movable ranges of the first and second diaphragms 2, 3 are limited within the depths of the first recess 11a' and the second recess 12a', respectively.

It will be understood that the structure of the fourth embodiment also provides a similar mechanical reinforcement to the fixed electrode supporting structure and completely the same effects as the foregoing third embodiment.

Figure 6A:
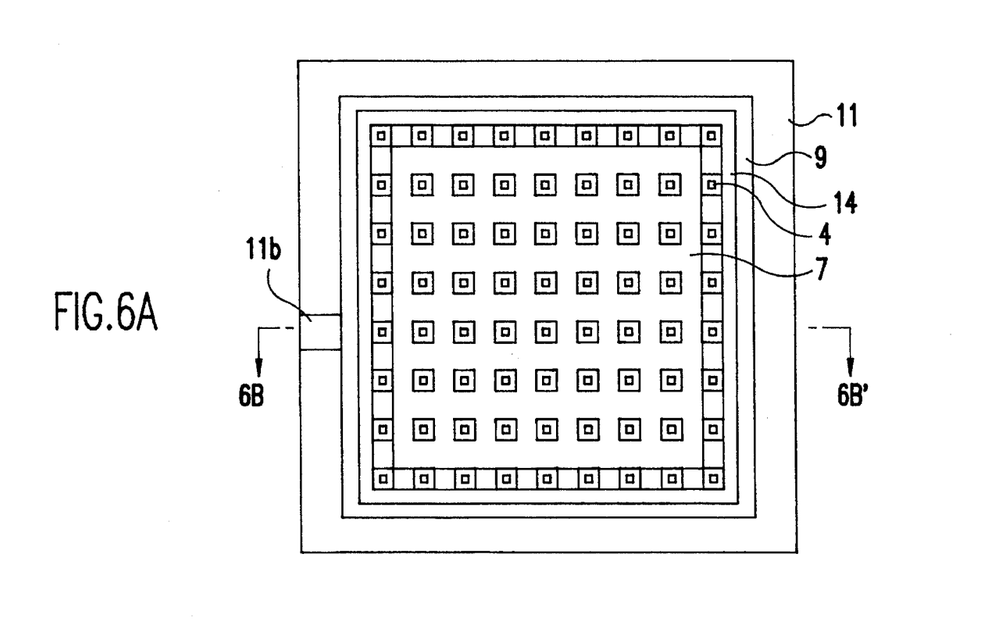
FIG. 6A shows a plan view of a capacitive pressure sensor according to a fifth embodiment of the present invention.
Figure 6B:
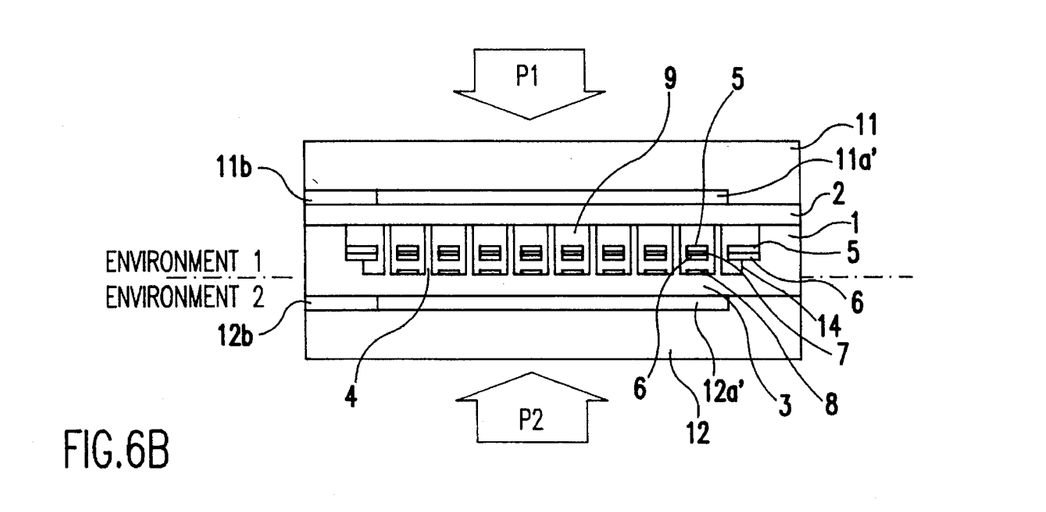
FIG. 6B is a cross-sectional view showing the structure of the capacitive pressure sensor illustrated in FIG. 6A.

FIGS. 6A and 6B show a fifth embodiment of the capacitive pressure sensor according to the present invention. In these drawings, parts identical to those in FIGS. 2A–2C are designated the same reference numerals. The fifth embodiment differs from the second embodiment in the way a fixed electrode 7 sandwiched by a first electrode support plate 5 and a second electrode support plate 6 is fixed to a diaphragm support 1 as well as the area of a recess 11a' in a first stopper 11 and the area of a recess 12a' in a second stopper 12.

More specifically, a second diaphragm 3 is formed with a step 14 along a peripheral portion of the bottom, with which a peripheral portion of the second fixed electrode support plate 6 is in close contact, thus securely supporting the fixed electrode 7 to the diaphragm support 1. Also, the first recess 11a' and the second recess 12a' are formed smaller than the entire surface area of a central cavity 9. When seen in the cross-sectional view of FIG. 6B, the first and second cavities 11a' and 12a' are formed in such sizes that they are accommodated inside the step 14 on the bottom of the central cavity 9 in the second diaphragm 3. In this way, movable ranges of the first and second diaphragms 2, 3 are limited within the depths of the first recess 11a' and the second recess 12a', respectively.

It will be understood that the structure of the fifth embodiment also provides a similar mechanical reinforcement to the fixed electrode supporting structure and completely the same effects as the foregoing third embodiment.

Figure 7A:
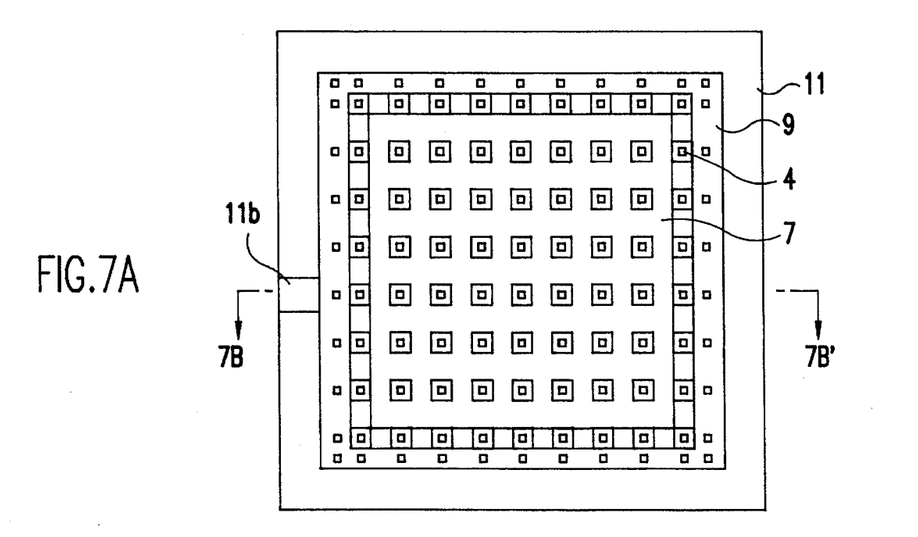
FIG. 7A shows a plan view of a capacitive pressure sensor according to a sixth embodiment of the present invention.
Figure 7B:
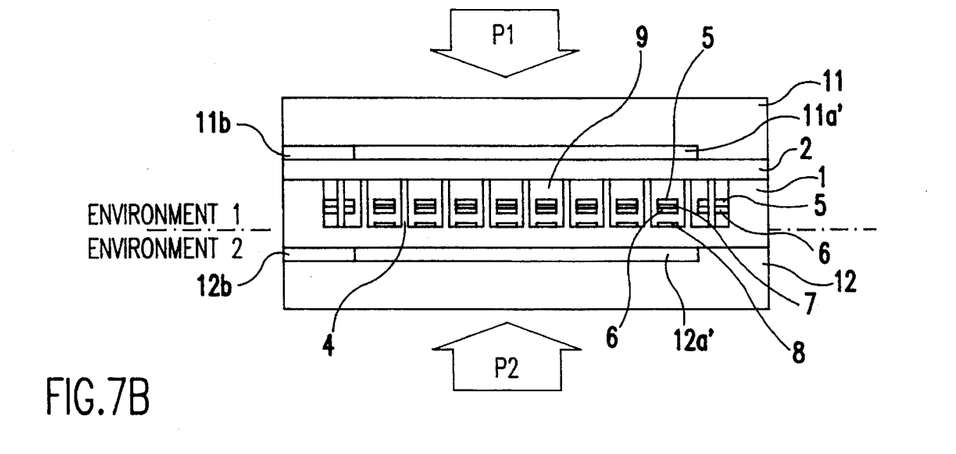
FIG. 7B is a cross-sectional view showing the structure of the capacitive pressure sensor illustrated in FIG. 7A.

FIGS. 7A and 7B show a sixth embodiment of the capacitive pressure sensor according to the present invention. In these drawings, parts identical to those in FIGS. 2A–2C are designated the same reference numerals. The sixth embodiment differs from the second embodiment in the way a fixed electrode 7 sandwiched by a first electrode support plate 5 and a second electrode support plate 6 is fixed to a diaphragm support 1 as well as the area of a recess 11a' in a first stopper 11 and the area of a recess 12a' in a second stopper 12.

More specifically, the fixed electrode 7 sandwiched by the support plates 5, 6 is bonded to the surfaces of a plurality of pillars 4 near the periphery of the cavity 9 for the secure supporting. Also, the first recess 11a' and the second recess 12a' are formed smaller than the entire surface area of a central cavity 9. When seen in the cross-sectional view of FIG. 5B, the first and second recesses 11a' and 12a' are formed in such a size that they are accommodated inside the area defined by the plurality of pillars 4 to which the fixed electrode structure is bonded. In this way, movable ranges of the first and second diaphragms 2, 3 are limited within the depths of the first recess 11a' and the second recess 12a', respectively.

It will be understood that the structure of the sixth embodiment also provides a similar mechanical reinforcement to the fixed electrode supporting structure and completely the same effects as the foregoing third embodiment.

Figure 8A:
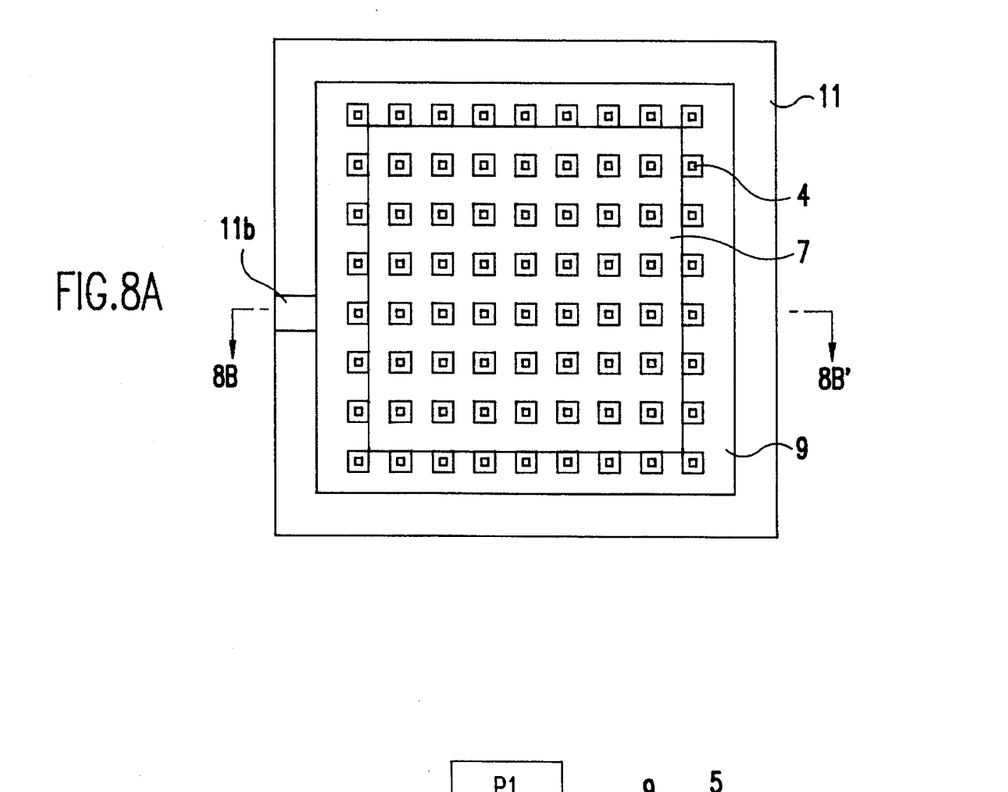
FIG. 8A shows a plan view of a capacitive pressure sensor according to a seventh embodiment of the present invention.
Figure 8B:
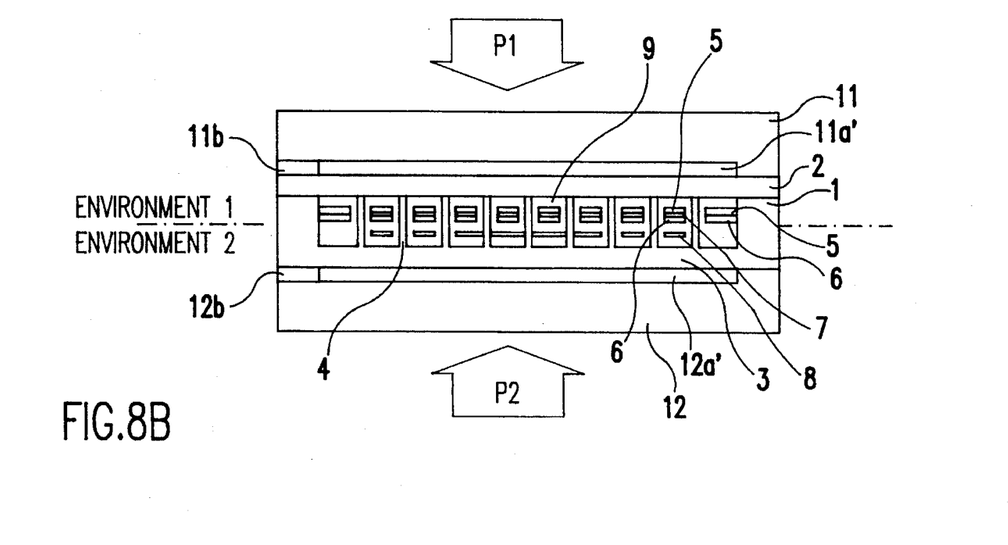
FIG. 8B is a cross-sectional view showing the structure of the capacitive pressure sensor illustrated in FIG. 8A.

FIGS. 8A and 8B show a seventh embodiment of the capacitive pressure sensor according to the present invention. In these drawings, parts identical to those in FIGS. 2A–2C are designated the same reference numerals. The seventh embodiment differs from the second embodiment in the way a movable electrode 8 is securely supported.

More specifically, the movable electrode 8 is bonded to the surfaces of pillars in a central portion of a cavity 9 for the secure supporting, as illustrated in FIG. 8B. When pressure P1 and pressure P2 are applied respectively to a first diaphragm 2 and a second diaphragm 3, central portions of the diaphragms generally present the largest deformation. Therefore, by bonding the movable electrode 8 to the surfaces of the plurality of pillars 4 in the central portion of the cavity 9, a measuring sensitivity (change in capacitance value in response to changing pressure) is enhanced.

The structure of the seventh embodiment enables highly sensitive pressure measurements in addition to having the effects of the second embodiment.

Figure 3C:
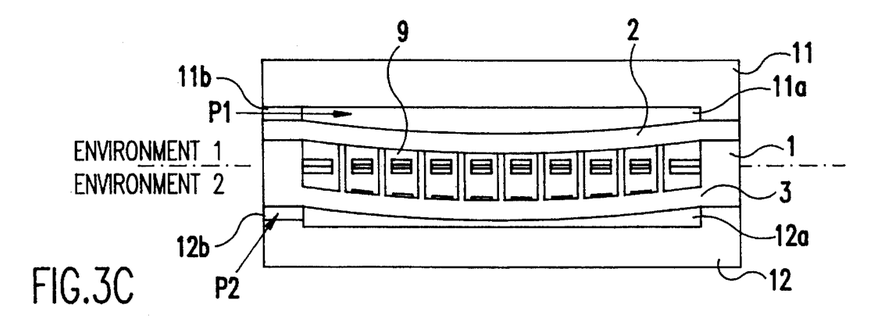
FIG. 3C is a cross-sectional view of the capacitive pressure sensor of FIG. 3B in operation.
Figure 9:
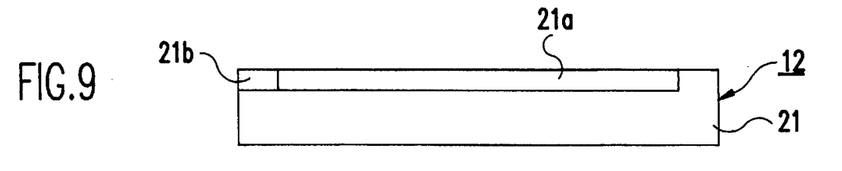
FIGS. 9 through 18 are cross-sectional views showing the processes of manufacturing the capacitive pressure sensor shown in FIGS. 3A–3C.

FIGS. 9–18 are cross-sectional views showing an embodiment of a method of manufacturing the capacitive pressure sensor illustrated in FIGS. 3A–3C. First, as shown in FIG. 9, a first relatively thick sapphire substrate 21 having at least one surface thereof mirror polished is formed in the mirror polished surface with a recess 21a destined to serve as the second recess 12a and a groove 21b destined to serve as the pressure introducing hole 12b by wet etching, dry etching, lapping and polishing, or the like, thus creating the second stopper 12. It should be noted that the mirror polished surface of the first sapphire substrate 21 has a surface roughness Ra less than approximately 1 nm. This surface roughness value is also applied to mirror polished surfaces of all sapphire substrates appearing in the following processes.

Figure 10:
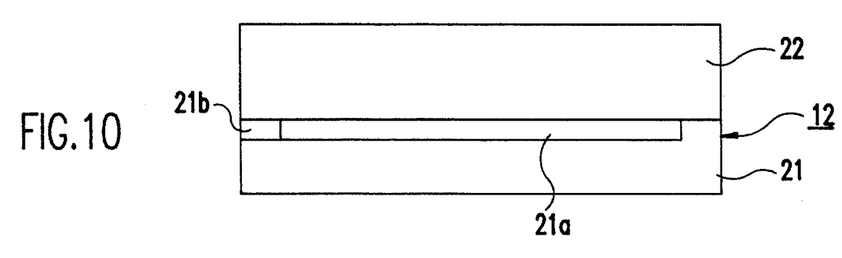

Next, as shown in FIG. 10, on the mirror polished surface of the first sapphire substrate 21, in which the recess 21a and the groove 21b have been formed, a second relatively thick sapphire substrate 22 having at least one surface mirror polished is bonded by direct bonding. Particularly in this process, the mirror polished surface of the first sapphire substrate 21 and the mirror polished surface of the second sapphire substrate 22 are directly bonded to each other without using any adhesive in a clean atmosphere of Class 10 or less. Subsequently, the bonded sapphire substrates 21, 22 are annealed at approximately 200°–1300° C. for firmly bonding them. This annealing process may be performed in an air, vacuum, or inert gas atmosphere.

In another embodiment, one or both of the bonding surfaces of the first and second sapphire substrates 21, 22 may be applied with a glass layer at a room temperature, and then the first and second sapphire substrates 21, 22 are bonded with the intervention of the glass layer(s) at a room temperature. Thereafter, the assembly is heated at approximately 100°–200° C. In a further embodiment, a silicon thin film may be applied on one of the bonding surfaces of the first and second sapphire substrates 21, 22 while a Pyrex glass thin film on the other bonding surface, and the first and second sapphire substrates 21, 22 may be bonded by an anode bonding technique.

Figure 11:
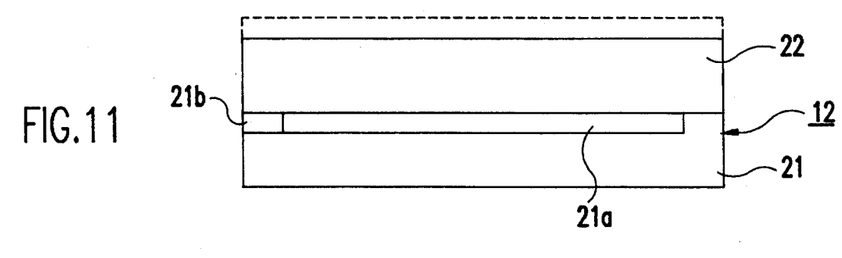

Next, as shown in FIG. 11, the outer surface of the second sapphire substrate 22 opposite to the mirror polished surface in which the recess 21a and the groove 21b have been formed is lapped and polished to a predetermined thickness. Alternatively, the second sapphire substrate 22 may be thinned by a chemical technique such as wet etching and dry etching. In any case, the finished surface must present a mirror surface.

Figure 12:
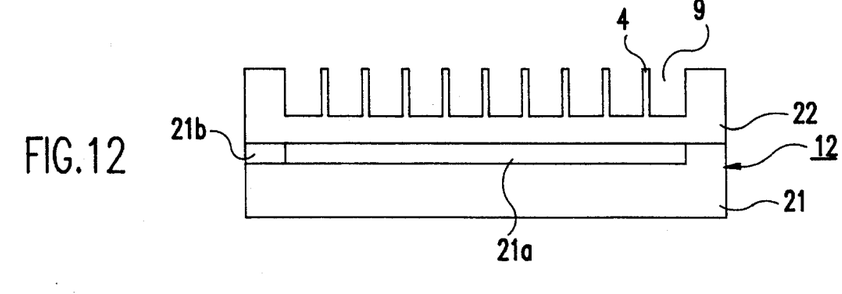

Next, as shown in FIG. 12, a plurality of pillars 4 and a cavity 9 are simultaneously formed by wet-etching or dry-etching the upper surface of the second sapphire substrate 22.

Figure 13:
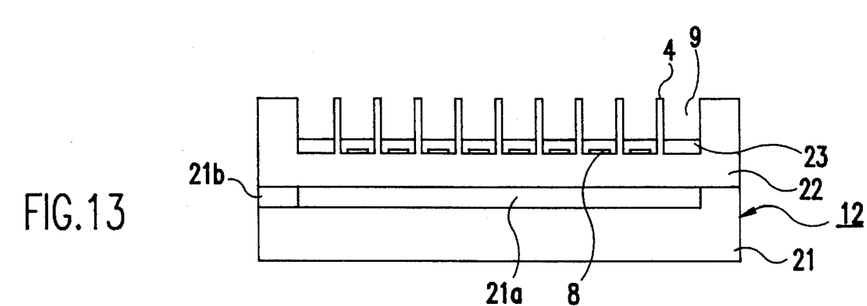

Next, as shown in FIG. 13, a conductive thin film is formed on the bottom of the cavity 9 in the second sapphire substrate 22 and patterned to create a movable electrode 8 in a predetermined shape. The formation of the conductive thin film may be carried out by CVD (Chemical Vapor Deposition), vacuum deposition, sputtering or the like, which is a dry film forming method generally employed in the semiconductor manufacturing processes. Then, a first sacrifice layer 23 is stacked on the movable electrode 8 formed on the bottom of the cavity 9 by CVD, vacuum deposition, sputtering, or the like.

Figure 14:
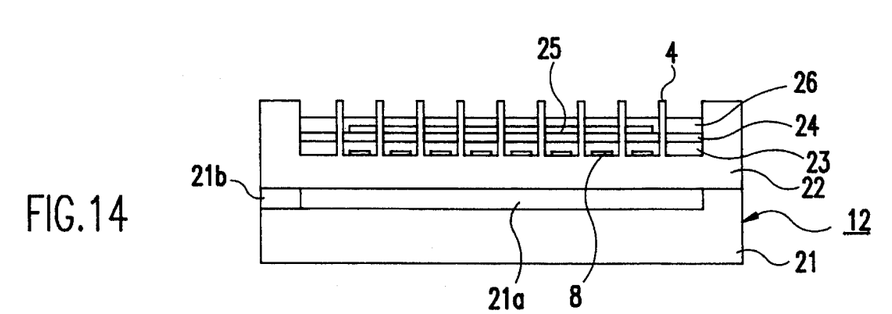

Next, as shown in FIG. 14, a first insulating layer 24 destined to serve as the second fixed electrode support plate 6 is stacked on the first sacrifice layer 23 by CVD, vacuum deposition, sputtering, or the like. Thereafter, a conductive thin film is formed on the first insulating layer 24 by CVD, vacuum deposition, sputtering, or the like and patterned to create the fixed electrode 7. The fixed electrode 7 should be formed in parallel with and opposite to the movable electrode 8 formed on the bottom of the cavity 9. Then, a second insulating layer 26 destined to serve as the first fixed electrode support plate 5 is stacked on the fixed electrode 7 by the same method as that used to form the first insulating layer 24.

Figure 15:
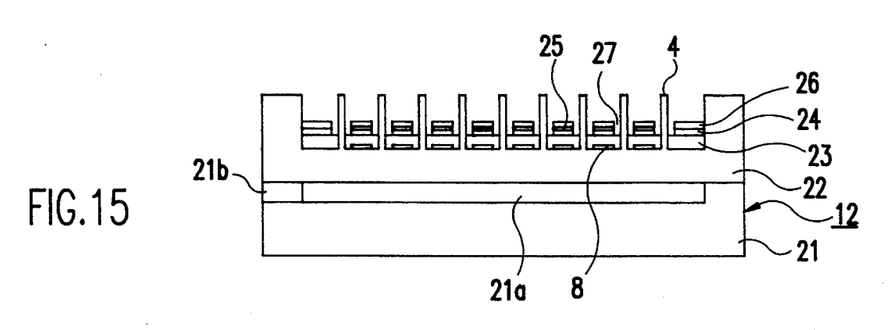

Next, as shown in FIG. 15, a stacked layer structure consisting of the first insulating layer 24, the fixed electrode 7, and the second insulating layer 26 formed in the cavity 9 is partially removed by wet etching or dry etching so as to form openings 27 around each of the pillars 4. These openings 27 are used for etching the sacrifice layer 23.

Figure 16:
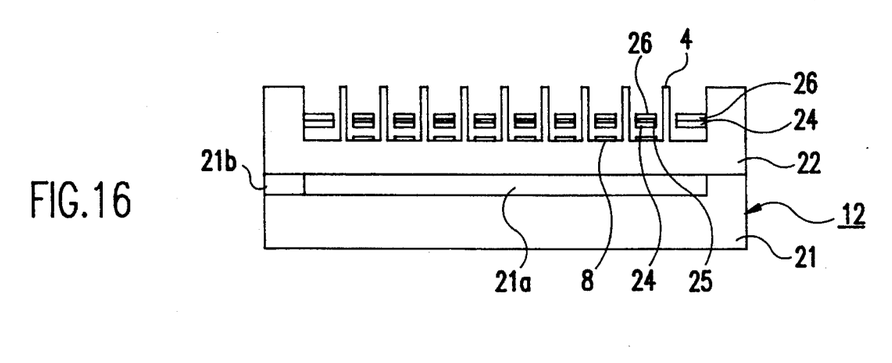
Figure 17:
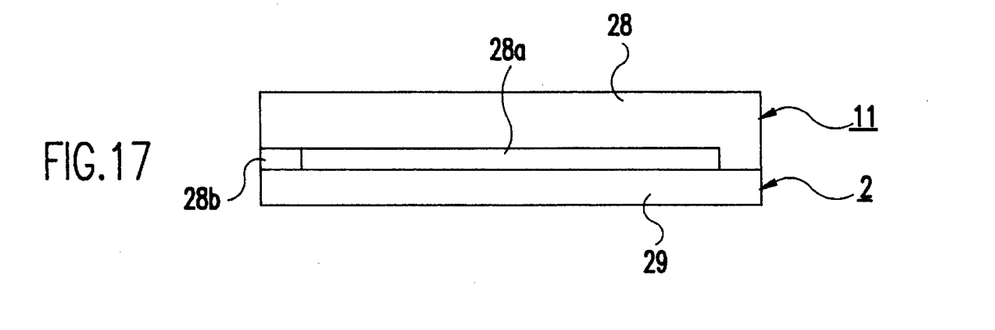

Next, as shown in FIG. 16, the first sacrifice layer 23 formed on the bottom of the second sapphire substrate 22 is removed using a wet etching technique by applying an etchant through the openings 27. In this event, since the first insulating layer 24 and the second insulating layer 26 are attached to the inner wall of the cavity 9 in the second sapphire substrate 22 upon formation of these layers, the fixed electrode 7 is sandwiched between the first and second insulating layers 24 and 26, as illustrated, after the first sacrifice layer 23 has been removed, Next, as shown in FIG. 17, a third relatively thick sapphire substrate 28 having at least one surface thereof mirror polished is processed by a preferred method including wet etching, dry etching, lapping and polishing, and so on, i.e., a similar method to that explained in connection with FIGS. 9–11, to form a recess 28a in a predetermined shape destined to serve as the second recess 11a and a groove 28b destined to serve as the pressure introducing 12b in the mirror polished surface, thus completing the first stopper 11. Subsequently, a fourth relatively thin sapphire substrate 29 having at least one surface thereof mirror polished is bonded by a direct bonding technique or the like, similar to the aforementioned method applied to the third sapphire substrate 28, with the mirror polished surface of the fourth sapphire substrate 29 facing the surface of the third sapphire substrate 28 having the recess 28a and the groove 28b formed therein, thus forming the first diaphragm 2.

Figure 18:
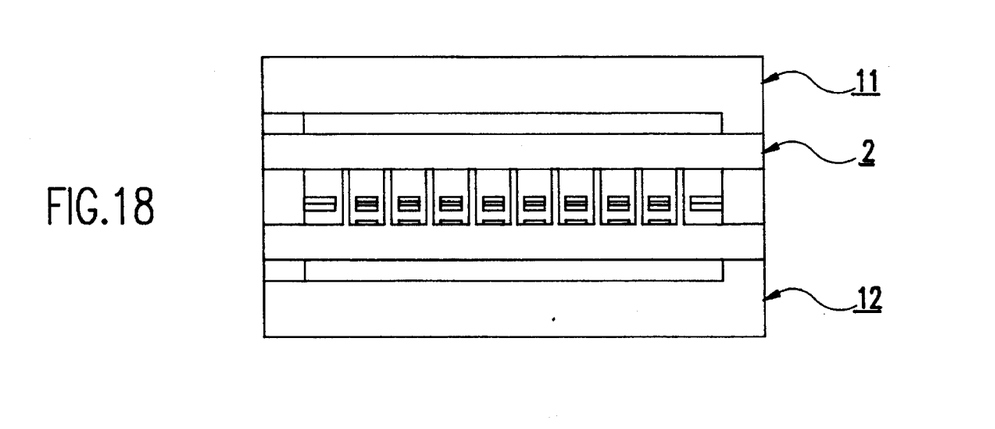

Next, as shown in FIG. 18, on top of the second sapphire substrate 22, the outer surface of the fourth sapphire substrate 29 is bonded by the aforementioned direct bonding technique or the like, thus completing the capacitive pressure sensor as shown in FIG. 3A.

According to the manufacturing method as described above, since the first and second diaphragms are made of the same material, the capacitive pressure sensor structure is mainly constructing by the direct bonding technique without using any adhesive. The capacitive pressure sensor mainly constructed by direct bonding of one and the same material, i.e., sapphire in the foregoing embodiment, is free from residual stress which would otherwise present on the bonding interface when different materials are bonded, and accordingly will not suffer from errors caused by aging change of the residual stress.

While the present invention has been described in connection with specific embodiments thereof, it is apparent to those skilled in the art that the present invention is not limited to those particular forms but may be modified in various ways without departing from the spirit and scope of the present invention.

For example, while the sensor structure has been described as being formed of members made of sapphire, these members may be made of one or any combination of other materials having electric insulating properties such as silicon, Pyrex glass, quartz glass, or the like. In this case, for bonding a silicon member to a Pyrex glass member, an anode bonding technique may be utilized. For bonding quartz glass members, a direct adhesion similar to the aforementioned bonding of sapphire members may be utilized. Also, a bonding technique using low melting point glass as an adhesion layer may be unitized irrespective of selected materials.

While in the foregoing embodiments the sensor structure has been formed using sapphire, it is contemplated that, even if made of other materials, sensors having the same structure fall within the scope of the present invention. In this case, a sensor made of different materials has the same effects as described above except for the advantage of the sensor made of the single material that the pressure measurement is free from errors due to aging change of residual stress on the bonding interface.

While the fixed electrode 7 is supported by the sandwich structure of the first and second fixed electrode support plates 5, 6 in the embodiments, the fixed electrode 7 may be supported by only one of the first and second support plates 5, 6.

While the first and second fixed electrode support plates 5, 6 have been formed by the thin film formation processes in the embodiments, they may be provided by lapping and polishing a sapphire substrate or a quartz glass substrate to a required thickness.

The shape of the sensor may be rectangular, circular, or any other shape than the substantially square shape which has been described in the embodiments.

Also, while the cavity and recesses have been formed in substantially a square shape, they may be in any other shape such as rectangle, circle, or the like.

The shape of the pillars 4 is not limited to any particular shape, but may be arbitrarily selected from all possible shapes in accordance with a particular application and manufacturing processes.

Also, the number and arrangement of the pillars 4 are not limited to the illustrated single example, but any number of pillars 4 may be provided in any preferred arrangement.

As described above, the improved pressure sensor according to the present invention is capable of highly accurately and reliably measuring pressure over a wide range from an extremely low level to a high level without being affected by environmental changes. Measured values are substantially free from errors due to fluctuations in atmospheric pressure and errors caused by aging changes of residual stress on the bonding interface.

It is to be understood that the present invention is not limited to the particular forms illustrated and that it is intended in the appended claims to cover all modifications that do not depart from the spirit and scope of this invention.

What is claimed is:

1. A capacitive pressure sensor comprising:

a first diaphragm;

a second diaphragm bonded to said first diaphragm so as to form a cavity between said first diaphragm and said second diaphragm with said cavity isolated from outside said cavity;

a plurality of pillars for securely supporting said first and second diaphragms;

a movable electrode formed on the bottom of said cavity on said second diaphragm; and a fixed electrode formed over the entire area of said cavity without contacting with said plurality of pillars, said fixed electrode securely supported by the inner wall of said cavity substantially in parallel with said movable electrode, said fixed electrode constituting a capacitor structure together with said movable electrode.

2. A capacitive pressure sensor according to claim 1, wherein said first and second diaphragms are made of a single material.

3. A capacitive pressure sensor according to claim 2, wherein said single material is sapphire.

4. A capacitive pressure sensor according to claim 3, wherein said first diaphragm, and said second diaphragm are bonded by a direct bonding technique.

5. A capacitive pressure sensor according to claim 1, wherein said fixed electrode is sandwiched by first and second insulating layers.

6. A capacitive pressure sensor according to claim 1, further comprising an excessive pressure protecting mechanism for protecting said capacitive pressure sensor from being destroyed by an excessively large pressure applied thereto.

7. A capacitive pressure sensor according to claim 6, wherein said excessive pressure protecting mechanism includes:

a first stopper having a pressure introducing groove and a recess on one surface, arranged on said first diaphragm, with the surface formed with the recess facing the top surface of said first diaphragm; and a second stopper having a pressure introducing groove and a recess on one surface, arranged below said second diaphragm, with the surface formed with the recess facing the bottom surface of said second diaphragm.

* * * * *